United States Patent [19]

Klimo

[11] 4,387,325

[45] Jun. 7, 1983

[54] ELECTRIC WHEELCHAIR WITH SPEED CONTROL CIRCUIT

[75] Inventor: Robert G. Klimo, Parma, Ohio

[73] Assignee: Invacare Corporation, Elyria, Ohio

[21] Appl. No.: 254,443

[22] Filed: Apr. 15, 1981

[51] Int. Cl.³ .............................................. H02P 7/68
[52] U.S. Cl. ....................................... 318/71; 318/317; 318/331; 180/DIG. 2
[58] Field of Search .................... 318/317, 331, 71; 180/341, DIG. 2

[56] References Cited

U.S. PATENT DOCUMENTS

| | | | |
|---|---|---|---|
| 3,629,633 | 12/1971 | O'Callaghan | 318/317 |
| 3,683,253 | 8/1972 | Rummel et al. | 318/331 |
| 4,059,786 | 11/1977 | Jones et al. | 180/DIG. 3 |
| 4,079,301 | 3/1978 | Johnson | 318/331 X |
| 4,151,450 | 4/1979 | Fukuma et al. | 318/317 |
| 4,291,260 | 9/1981 | Nixon | 318/331 |
| 4,300,081 | 11/1981 | Van Landingham | 318/331 X |
| 4,303,874 | 12/1981 | Iwai | 318/331 |

*Primary Examiner*—B. Dobeck
*Attorney, Agent, or Firm*—Fay & Sharpe

[57] ABSTRACT

The speed control circuit detects an actual and selected speed for the wheelchair and supplies power to the wheelchair motors in a manner which tends to bring the actual and selected speeds into conformity. A reference signal circuit detects a speed and direction selected by a joystick and produces a reference signal whose magnitude varies with the selected speed. The reference circuit includes a polarity circuit which detects the polarity of the reference signal to determine whether the motors are to be rotated in a forward or reverse direction. The voltage and current across the armature of the motor are both detected as measures of its actual speed. A comparing circuit compares the actual speed as determined by the armature voltage and current with the selected speed as denoted by their reference signal. Specifically, it subtractively combines the armature voltage and the reference signal to produce a first difference signal. Further, it subtractively combines the first difference signal with the armature current signal to produce a speed error reference signal. The speed error reference signal controls a variable power regulator which varies the amount of power supplied to the motor in a manner which tends to cause the actual and selected speeds to match.

17 Claims, 4 Drawing Figures

U.S. Patent   Jun. 7, 1983   Sheet 1 of 3   4,387,325
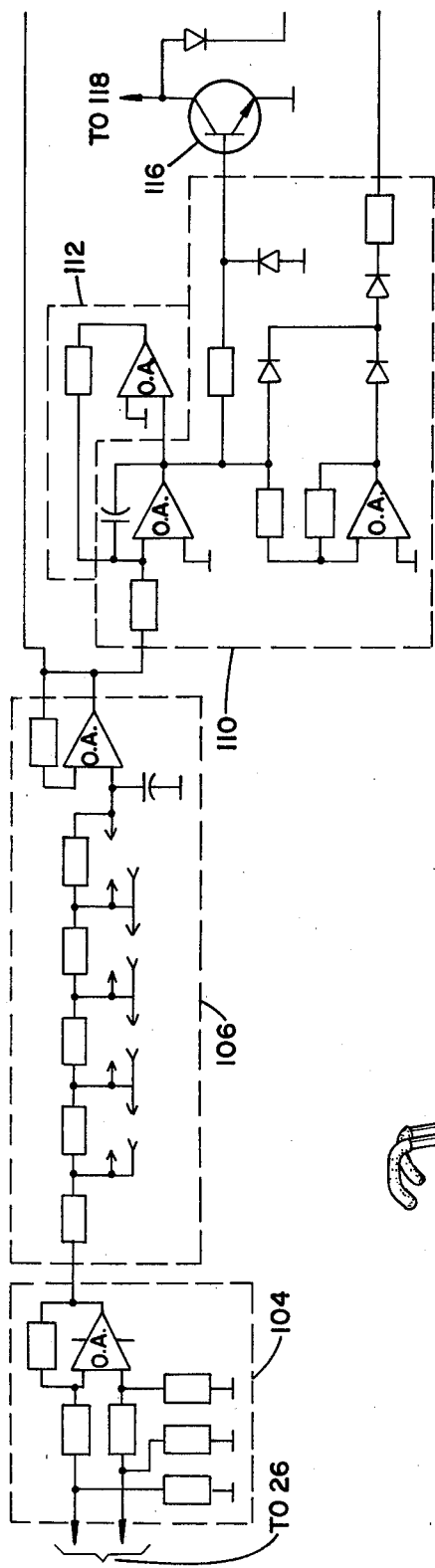
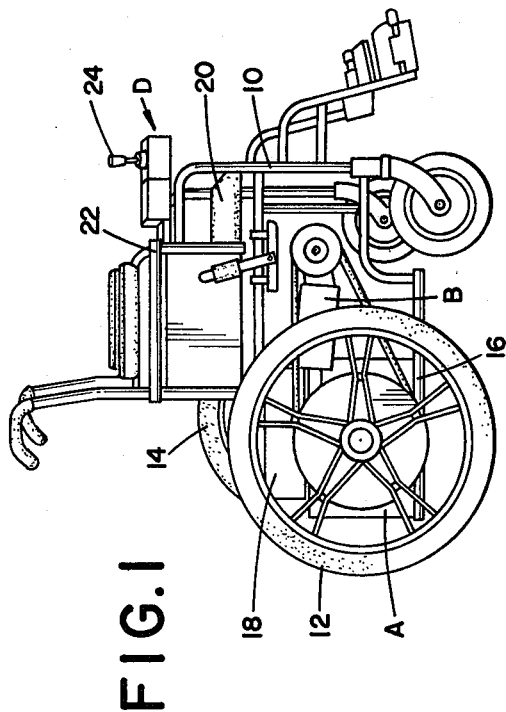

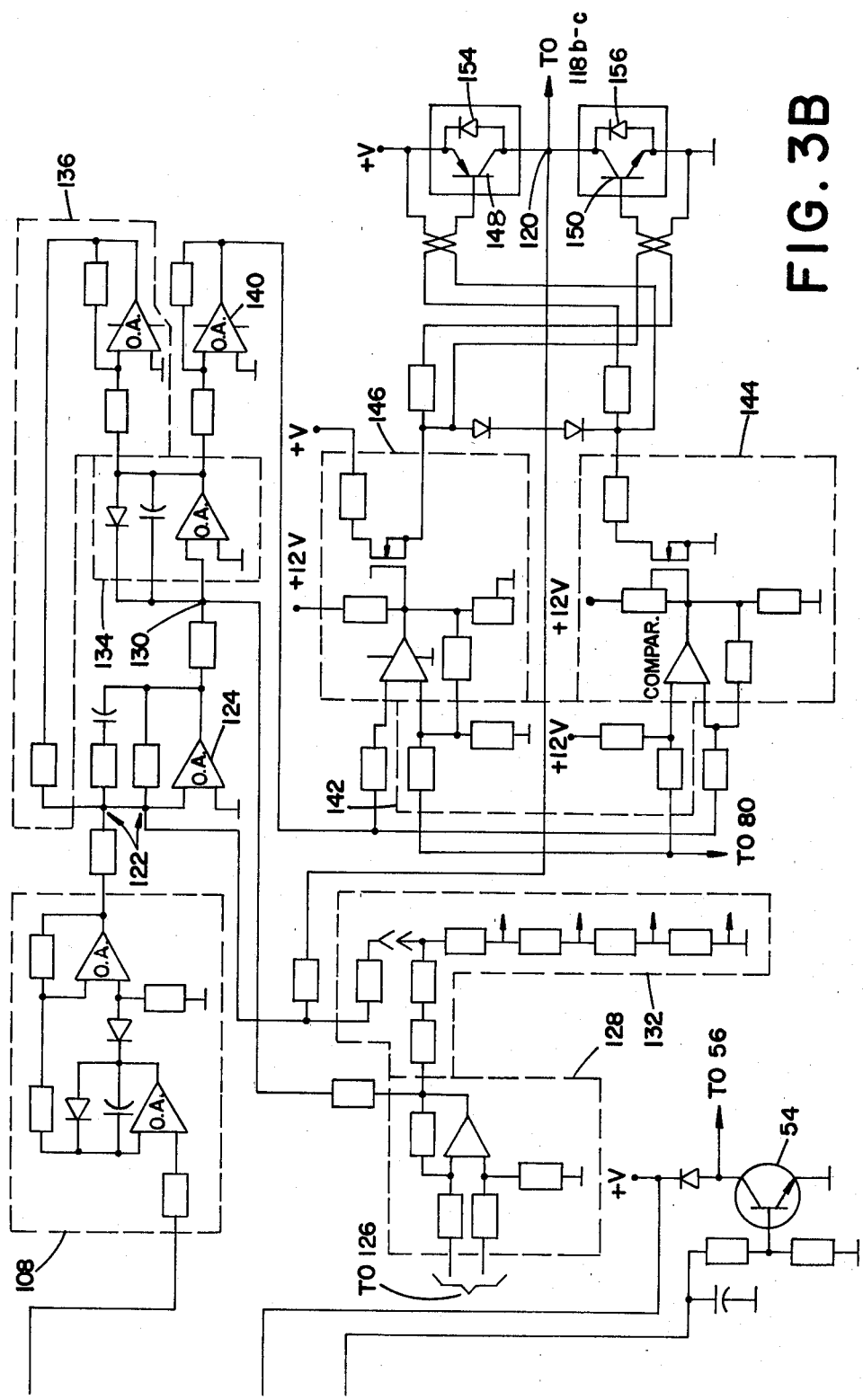

ELECTRIC WHEELCHAIR WITH SPEED CONTROL CIRCUIT

BACKGROUND OF THE INVENTION

This application pertains to the art of electronic speed controls and more particularly to feedback space controls. The invention finds particular application in controlling the speed of electric wheelchairs and will be described with particular reference thereto. It will be appreciated, however, that the invention has broader applications, such as controlling the speed of other motorized patient care devices, electric vehicles, machine tool motors, and the like.

Conventionally, electric wheelchairs are driven by a pair of permanent magnet, DC electric motors connected with their driving wheels. A battery pack is mounted in the wheelchair for supplying electric power to the motors. A joystick, which is mounted with easy manual access to the operator, controls the amount and polarity of the power which is supplied from the battery to each of the drive motors. To move and accelerate the wheelchair, the control circuit supplies power to the motors. To slow the wheelchair, the control circuit stops supplying power to the motors. When a permanent magnet DC motor coasts, it functions as a generator. Commonly, a resistor is connected across the coasting motors to dissipate the generated electrical energy and slow the motors. This braking effect, which is commonly denoted as dynamic braking, is increased as the size of the braking resistance is decreased.

An exemplary prior art wheelchair speed control is illustrated in U.S. Pat. No. 4,157,123, issued June 5, 1979 to Keith S. Rodaway. In the Rodaway patent, a manually operated joystick is surrounded by four on-off switches for independently applying power from the battery to the right and/or left wheel motors with either a forward or reverse polarity. The joystick can be tipped to actuate one of the switches for the right motor pair and/or one for the left motor. By operating the appropriate switches, the joystick can cause the chair to move forward, rearward, turn to the right, turn to the left, or pivot. When the joystick is not supplying power of either polarity to one or both of the motors, a power dissipating resistor is connected across that motor. To select the speed, a fast/slow switch is provided separate from the joystick.

One of the problems with the Rodaway circuit is that the speed of the wheelchair is affected by several uncontrolled factors. When the chair is proceeding downgrade, it will move faster and, when it is moving upgrade, it will move slower. Further, operating on-off switches rather than continuously variable switches, such as a potentiometer, with the joystick limits the selection of speed, handling, and performance. For example, there is a single turning radius for right and lefthand turns which, like the speed, varies if the chair is on a grade. Another problem is that the wheelchair can gain excessive speed on a downgrade, because the power to the motors and the connection of the braking resistor across the motors is controlled by the joystick position and not the actual speed.

Another exemplary prior art wheelchair control circuit is illustrated in U.S. Pat. No. 4,059,786, issued Nov. 22, 1977 to Michael Lloyd Jones et al. In the Jones patent, the speed of the wheelchair is controlled by a joystick which operates a potentiometer providing a continuously variable analog voltage indicative of the selected speed. A pulse width modulator converts the modulus of the potentiometer voltage into a proportionate amount of power for the driving motor. A reversing relay is provided for changing the polarity with which the power is provided to the motor for forward and reverse directions. Like the later Rodaway patent, the Jones et al. patent includes a dynamic braking resistor which is shunted across the motor to slow the wheelchair. The Jones circuit further has an armature voltage detector for enabling the forward/reverse relay to change states only when there is substantially no voltage across the armature, i.e., when the motor is stationary. An overload detector including a resistor in series with the power supply and the motor prevents an excessive amount of power from being supplied to the motor regardless of the position of the joystick.

One problem with the Jones control is that, like the Rodaway control, the amount of driving power supplied to each motor depends only on the joystick position. No accommodation is made for the actual speed of the chair. On uneven terrain, the speed and handling of the chair became unpredictable and hard to control.

The present invention contemplates a new and improved speed control circuit which overcomes the above-referenced problems and others. It provides a speed control circuit which accurately holds the selected speed of a wheelchair even over uneven terrain.

SUMMARY OF THE INVENTION

In accordance with the present invention there is provided a control circuit for an electric wheelchair which has at least one motor for driving at least one wheel, a joystick for selecting a speed and direction for the wheel and a battery or other voltage supply from which the motor is driven. The control circuit detects the actual and selected speeds of the wheel and supplies power to the motor or dissipates power from the motor in a manner which tends to cause the selected and actual speeds to match. In accordance with a more limited aspect, left and right drive motors are provided and a separate control circuit is provided for each motor.

In accordance with one aspect of the invention, the joystick is connected with a reference signal means for producing a reference signal whose magnitude varies with the selected speed. Connected with the motor is a detector for detecting the actual speed of the motor and producing an armature signal which varies therewith. A combining means subtractively combines the reference signal and the armature signal to produce a difference signal which varies with the error or difference between the actual and selected speeds. A variable power regulating circuit is controlled by the combining means to supply to the motor an amount of power in accordance with the difference signal. In accordance with a more limited aspect of the invention, the detector detects the armature voltage, the armature current, or both to provide an accurate determination of the actual motor speed.

In accordance with another aspect of the invention, the joystick is connected with a sliding contact of a potentiometer for movement therewith. The sliding contact is electrically connected with a voltage supply. The ends of the joystick potentiometer are connected with the inputs of a differential amplifier. In this manner, the differential amplifier output varies in magnitude and polarity even though the voltage supply has a constant polarity.

In accordance with another aspect of the invention, there is provided a reference signal means for producing a reference signal whose magnitude varies with a selected speed and an oscillator which produces an oscillating signal. A first pulse width modulator compares the magnitude of the reference and oscillating signals and produces a first pulse train whose periodicity varies with the periodicity of the oscillating signal and whose pulses vary in width with the comparison between the reference and oscillating signals. A second pulse width modulator compares the oscillating signal with the reference signal and produces a second pulse train whose periodicity varies with the oscillating signal and whose pulses vary in width with the comparison between the oscillating and reference signals. The first and second pulse width modulators perform opposite comparisons such that the pulses of the first and second pulse trains are generated alternately. A first transistor which is gated by the pulse train from the first pulse width modulator supplies a voltage to the electric motor armature. A second transistor means which is gated by the second pulse train connects the armature with ground.

In accordance with another aspect of the present invention, there is provided a low battery shut-off mechanism for disabling the control circuit from driving the motors when the battery potential falls below a predetermined level. This prevents the wheelchair from acting erratically when the potential from the battery is too low to bias the control components properly and completely.

A primary advantage of the present invention is that it accurately controls the actual speed of the wheelchair. The circuit automatically compensates for the different power requirements of the motor when the chain encounters uneven terrain and other speed affecting conditions. The circuit provides automatic braking when the actual speed of the chair exceeds the selected speed.

Another advantage of the present invention is that it accurately and simply limits the maximum current which may be supplied to the drive motors.

Another advantage of the present invention is that the direction is changed and the speed is increased or decreased gradually and smoothly, even if the joystick is operated erratically or suddenly. Sudden reversals, acceleration, and lurching are eliminated.

Yet another advantage of the present invention is that low or discharged batteries are prohibited from causing erratic handling.

Still other advantages will become apparent upon reading and understanding the following detailed description of the preferred embodiment.

BRIEF DESCRIPTION OF THE DRAWINGS

The invention may take form in various parts and arrangements of parts. The drawings are for purposes of illustrating a preferred embodiment of the invention only and are not to be construed as limiting it.

FIG. 1 is a diagrammatic illustration of an electric wheelchair in accordance with the present invention;

FIG. 3 is a detailed circuit schematic with exemplary component magnitudes denoted for one of the speed control circuits of FIG. 2.

DETAILED DESCRIPTION OF THE PREFERRED EMBODIMENT

Figure 2:
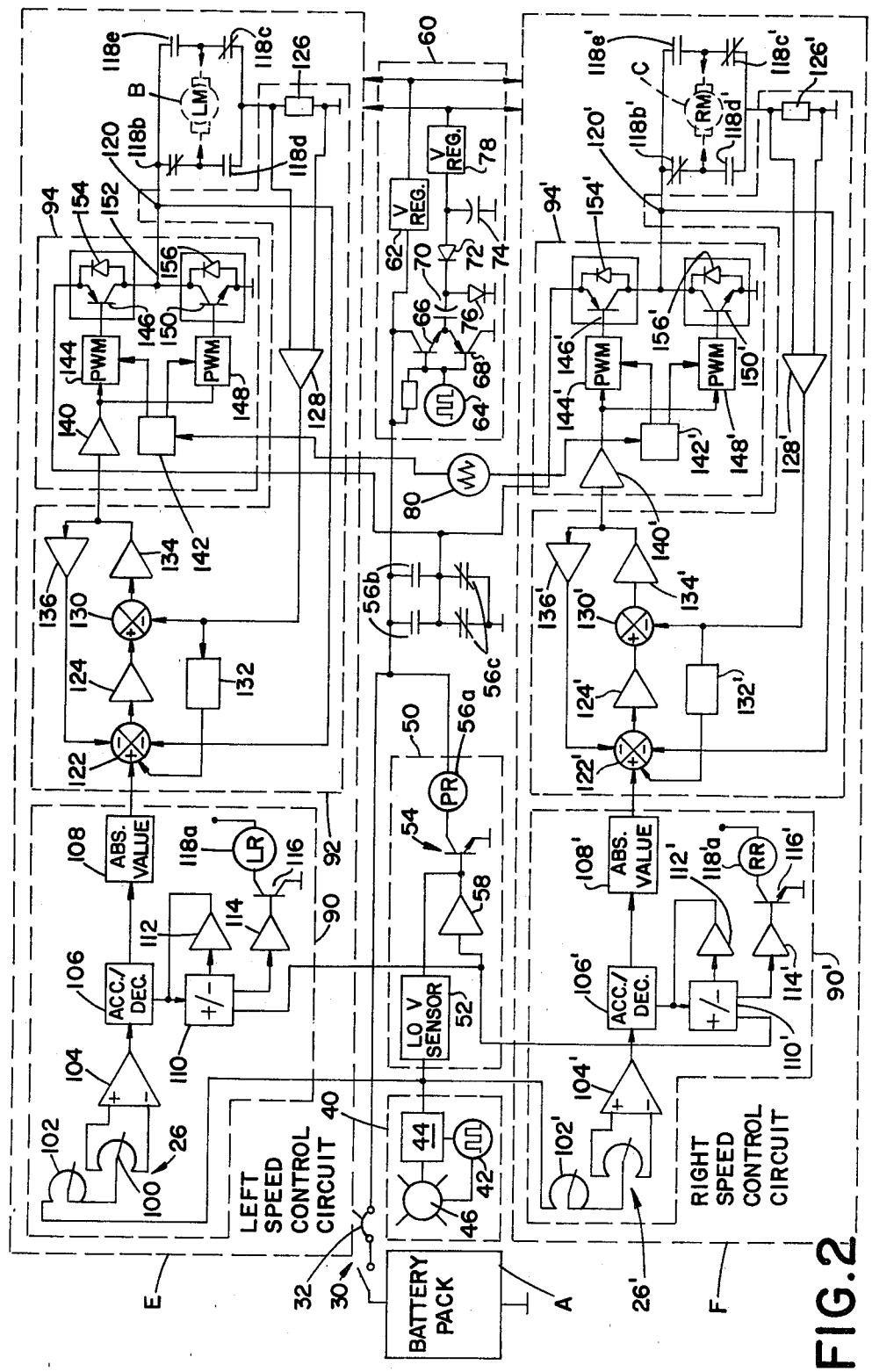
FIG. 2 is a schematic diagram of the electrical circuit of the electric wheelchair of FIG. 1, highlighting the speed control circuits.

With reference to FIGS. 1 and 2, the electric wheelchair has a battery pack A which supplies power to left and right DC electric motors B and C, respectively. The speed and direction of the wheelchair is selected by positioning a speed and direction selector or joystick D. Left and right speed control circuits E and F are physically mounted above the battery pack and are operatively connected with the battery, electric motors and the joystick for controlling the speed and direction of the motors such that their actual speed strives to match the selected speed.

With particular reference to FIG. 1, the wheelchair has a frame 10 to which left and right driving wheels 12 and 14, respectively, are rotatably mounted. A shelf or other support means 16 is positioned between the wheels for supporting the battery pack A. The left motor B is mounted on the frame and connected by a belt drive with the left driving wheel 12. The right motor C is mounted on the frame and is connected by a belt drive with the right driving wheel. Because the motors perform both braking and acceleration functions, clutch and mechanical brake mechanisms are not required. Disposed above the battery pack is a housing 18 for receiving with plug-in connections circuit boards on which the control and other electrical circuits are disposed. Above the housing 18 and motors is an operator supporting seat 20. The joystick D, which may be mounted at any convenient location, is most commonly mounted in conjunction with an arm support 22.

The joystick includes a control lever 24 which is pivotally mounted for 360° of motion in the horizontal plane. A left motor control potentiometer 26 and a right motor control potentiometer 26' are mounted at 90° relative to each other and at 45° relative to a straight ahead or reverse direction. They are mechanically interconnected with the joystick such that their sliding contacts move therewith. With this arrangement, pushing the joystick straight forward moves both potentiometers an equal amount selecting equal speeds for both motors such that the chair moves straight forward. Pulling the joystick rearward selects the same rearward speed for both motors. Moving the joystick forward or rearward and to the side causes one of the motors to be operated at a greater speed or in the opposite direction than the other. The relative difference in speeds varies with the degree of deviation from the central, forward and reverse path of the joystick. This allows the wheelchair to be turned at various speeds and with various radii of curvature or pivoted in one spot.

With reference to FIG. 2, the battery pack A includes one or more batteries with a relatively high ampere-hour rating. In the preferred embodiment, the battery pack includes a pair of lead-acid automotive-type batteries connected in series or other voltage supply, preferably in the 22 to 30 volt range. A manual switch 30 connects or disconnects the battery pack A from the remaining circuitry. A manual circuit breaker 32 is also connected in series between the battery pack and the remaining electrical circuitry to protect it from electrical malfunctions. The circuit breaker is positioned for easy access to the user to allow easy and immediate resetting after a malfunction has occurred.

A power indicator circuit 40 indicates whether an appropriate voltage is being supplied to the circuitry from the battery pack. The indicator circuit includes a comparator 44 and a gated, square wave oscillator 42. The comparator 44 compares the magnitude of the battery pack voltage with a reference voltage. When the battery voltage is greater than the reference voltage, the comparator output forces the square-wave oscillator 42 to a non-oscillating state which causes an indicator lamp 46 to glow continuously. When the battery pack voltage drops below the reference voltage, the output of comparator 44 allows the gated oscillator 42 to oscillate which causes the indicator lamp 46 to flash. Thus, the indicator circuit 40 indicates when the power is on as well as when the batteries have become discharged below a safe area. In the preferred embodiment, the fully charged battery pack has a 24 volt output and the oscillator voltage is 22 volts.

A low voltage lock out circuit 50 output is a safety feature which disables the wheelchair when the battery pack voltage drops below a safe operating range. When the battery voltage drops sufficiently, it fails to bias some of the electrical components to their normal, linear operating range. Thus, a partially discharged battery can cause erratic operation of the control circuits. In the preferred embodiment, the low voltage lock out circuit disables the wheelchair when the battery pack is discharged below 18 volts. The low voltage lock out circuit includes a low voltage sensing circuit 52 which compares the voltage from the battery pack with low voltage lockout voltage. When the lockout voltage exceeds the battery pack voltage, the low voltage sensing circuit 52 grounds the base of a transistor 54 to block current from flowing through a coil 56a of a power relay 56. This prevents the power relay 56 from being actuated or if actuated, causes it to drop out. In this manner, normally open contacts 56b are forced to their normally open state blocking power to the motors and normally closed contacts 56c are forced to their normally closed states grounding the motors.

A voltage regulator 60 provides a regulated positive 12 volts DC and negative 12 volts DC for biasing the various circuit components. The positive 12 VDC bias is produced with a conventional series regulator 62. The negative 12 VDC bias is derived from the positive output of the battery rather than the negative battery pack output which is grounded. An oscillator 64 alternately gates an NPN transistor 66 and a PNP transistor 68 which alternately charges and discharges a capacitor 70. A diode network 72 allows the capacitor 70 to draw a second capacitor 74 to a negative potential when the capacitor 70 is discharged by transistor 68, but blocks the charge drawn to capacitor 70 from returning to the capacitor 74 as the transistor 66 charges the capacitor 70 through a second diode 76. A conventional series regulator 78 regulates the negative voltage drawn on the capacitor 74 to the −12 VDC bias.

An oscillator 80, which is discussed in detail below, provides an oscillating power reference signal for both the left and right speed control circuits. In the preferred embodiment, this oscillator signal is a triangular wave in the range of 350 to 400 hertz with a six volt peak.

With continued reference to FIG. 2, the left speed control circuit E and the right speed control circuit F are substantially identical. To facilitate understanding of the invention, like parts in the right speed control circuit F are marked with the same reference numeral as the corresponding part and the left speed control circuit E but followed by a prime ('). Only the left speed control circuit E is described in detail and it will be understood that, unless noted otherwise, this description applies equally to the right speed control circuit F.

The speed control circuit includes a reference signal means 90 which detects the speed selected by the joystick D and produces a reference signal whose magnitude varies with the selected speed. An actual and selected speed comparing means of circuit 92 compares selected and actual speeds and produces a variance or speed error reference signal which varies with the difference between them. A variable power regulator 94 is controlled by the difference or speed error reference signal from the speed comparing circuit 92 to regulate the amount of power to the drive motor in a manner which tends to cause the actual and selected speeds to match.

With primary reference to FIG. 2 and secondary reference to FIG. 3, the reference signal means 90 includes the potentiometer 26. The potentiometer has a resistive segment extending between a first and a second end and a wiper or sliding contact 100 which is connected through a speed range control 102 with the DC voltage supply. The speed range control 102 adjusts the voltage which is applied to the wiper 100 to limit the maximum speed which can be selected. A differential amplifier 104 has its inputs connected with the first and second ends for substractively combining the analog voltages detected at each end and producing an analog reference signal which varies with their difference. When the sliding contact 100 is centered, the potential between the sliding contact and either end is the same and, accordingly, the differential amplifier output is zero. As the sliding contact is moved off center towards either side by motion of the joystick, the potentials at the ends become unbalanced and the differential amplifier output increases. As the sliding contact is moved towards the end connected to the negative differential amplifier input, the differential amplifier output increases in magnitude with a negative polarity and when it moves towards the end connected with the positive differential amplifier input, the differential amplifier output increases in magnitude and has a positive polarity.

A limiting circuit 106 limits the rate of change of the reference signal which limits the acceleration and deceleration of the wheelchair. Specifically, the output of the limiting circuit approaches its input exponentially. The limiting circuit input is connected with the differential amplifier output. Optionally, the acceleration and deceleration rate may be made selectable by interconnecting the differential amplifier and the limiting circuit with selectably adjustable resistances. An absolute value circuit 108 produces a negative analog output which varies directly with the magnitude of its input and independent of the polarity of its input. The absolute value circuit 108 causes the reference signal to vary in magnitude with the selected speed without regard to the selected direction or polarity.

A direction control circuit or polarity detector 110 detects the polarity of the reference signal from the limiting circuit 106. A deadband circuit including a hysteresis amplifier 112 feeds back a portion of the reference signal received from the limiting circuit 106 to create a deadband. Specifically, the deadband circuit has a preselected neutral or zero output when its input receives a voltage in a preselected range, such as from plus one volt to minus one volt, and has an output that varies with the input outside the preselected range. When the reference signal from the limiting circuit 106 exceeds the deadband range in either the positive or negative direction, it gates the transistor 54 to its conductive position which actuates the power relay 56. When the magnitude of the reference signal from the circuit 106 exceeds the deadband region in the negative or reverse direction, the direction control circuit 110 through an isolation amplifier 114 gates a transistor 116 to its conductive position to actuate a motor reversing relay 118. Specifically, when the transistor 116 becomes conductive, power flows through the reversing relay coil 118a causing normally closed reversing relay contacts 118b and 118c to open and normally open reversing relay contacts 118d and 118e to close to reverse the polarity of the voltage, if any, which is applied to the motor.

The comparing circuit 92 detects the actual speed by detecting an electrical condition of the armature of the motor. The armature voltage and current, for example, both vary with the actual speed of the motor. A voltage detector detects the voltage across the armature by detecting the voltage at node 120. More specifically, a predetermined portion of the potential across the armature from node 120 is fed back as input to the comparing circuit. A first subtractive combining means or summing node 122 combines the armature voltage and the reference signal to produce a first difference signal. In the preferred embodiment, the absolute value circuit 108 causes the reference signal to be negative and the voltage detected at 120 is positive, whereby their sum, the difference reference signal, varies with the difference between the actual and selected speeds. The first difference reference signal is amplified by an amplifier 124.

The speed comparing circuit 92 also includes an armature current detector for detecting the current flowing through the armature of the motor. The armature current detector includes a small resistance 126, on the order of a hundredth of an ohm, which is connected between the armature motor and ground. The armature current flows through the resistor 126 causing a small but measurable voltage drop which varies with the armature current. The voltage drop is scaled and the polarity inverted by an armature current amplifier 128. The relative gains of amplifiers 124 and 128 are selected to limit the armature current to a preselected maximum. Specifically, the output of amplifier 124 which corresponds to the maximum possible difference reference signal is selected to be equal in magnitude to the output of amplifier 128 which corresponds to the preselected maximum armature current. The first difference reference signal from amplifier 124 and the armature current signal from amplifier 128 are subtractively combined at a second subtractive combining means or summing node 130.

A compensation circuit 132 feeds back a portion of the armature current signal to the first subtracting means or summing node 122. The greater the amount of feedback provided by the compensation means 132, the more sensitive the circuit is to small differences between the actual and selected speeds. If too great a part of the armature current signal is fed back to the first subtracting means, the circuit becomes too sensitive and the wheelchair reacts suddenly to small changes between the actual and selected speeds. If too small a part of the armature current signal is fed back by the compensation means 132, the selected and actual speeds can vary widely before the control circuitry reacts to bring them back into conformance. Thus the amount of feedback is a trade-off to be selected to meet the operators expectations of good speed maintenance and smooth operation.

The second summing node 130 compares the first difference reference signal and the armature current signal by subtractively combining them to produce a second difference reference signal or error reference signal whose magnitude is adjusted by a current error amplifier 134. A deadband circuit comprising a hysteresis amplifier 136 inverts and feeds back a fraction of the error reference signal to the first subtracting means 122 to form a deadband around the neutral or no speed zone. The output of the current error amplifier 134 can, of course, be positive or negative depending on whether the actual speed exceeds or is exceeded by the selected speed.

The variable power regulator 94 includes an inverting amplifier 140 which inverts the polarity of the error reference signal. A deadband circuit 142 provides a small DC bias to the triangular wave or oscillating signal from the oscillator 80. A first pulse width modulator 144 compares the magnitude of a signal which it receives on a first of its inputs with the magnitude of a signal which it receives on the second of its inputs. The first of its inputs is connected with the inverting amplifier 140 and the second of its inputs is connected with the deadband circuit 142. In this manner, the first pulse width modulator generates a first pulse train whose periodicity varies with the oscillating signal and whose pulse width varies with the comparison with the signals received on its inputs. The first pulse train from the first pulse width modulator gates a pull-up transistor 146. A second pulse width modulator 148 compares the magnitude of the signals received on its first and second inputs. Its first input is connected with the deadband circuit 142 and its second input is connected with the inverting amplifier 140. The second pulse width modulator performs the opposite comparison than the first pulse width modulator. That is, the second pulse width modulator produces a second pulse train whose periodicity varies with the oscillating signals and whose pulse width varies with the comparison between the error reference signal and oscillating signals. However, the second pulse train produces a pulse when the reference signal exceeds the oscillating signal. In this manner, the pulses of the first and second pulse trains are generated alternately. The second pulse train gates a pull-down transistor 150. The DC offset which the deadband circuit 142 provides to the oscillating signal provides a deadband between the regions in which the pull-up and pull-down transistors are gated to insure that they are not gated simultaneously. Each time the pull-up transistor 146 is gated conductive, it pulls up the voltage on a line 152 to the battery pack voltage. Each time the pull-down transistor 150 is gated conductive, it connects the line 152 with ground. This insures that the voltage on line 152 is a square wave whose peak amplitude is the battery voltage and whose minimum amplitude is ground. The amount of power supplied to the motor by the variable power regulator 92 is determined by the relative duration of the peak amplitude to the minimum amplitude. The longer the pull-up transistor 148 remains gated compared with the pull-down transistor 150, the more power is supplied to the motor.

To slow the motor and wheelchair, the control circuit channels current generated by the motor in its generating mode into the battery pack to recharge the battery. This type of braking is denoted herein as "regenerative braking", although others have used "regenerative braking" as a synonym for "dynamic braking" in which the generated current is dissipated by a resistor. When a slowdown of the motor is called for, the duty cycle of the pulldown transistor 150 increases and the pullup transistor 146 duty cycle decreases. This causes the current direction in the armature to reverse and thus reverse the torque direction and slow down the chair. When the pull up transistor 146 turns off, the armature current that was flowing through the armature inductance will continue to flow but the path will be through diode 154 and therefore, return some of the braking current to the battery. This is denoted as regenerative braking or regeneration. Diode 156 provides a path for the armature current when pullup transistor 146 shuts off and in this mode is called a "free-wheeling" or "flyback" diode. Dynamic braking of the motor is provided when the power relay 56 is deenergized. The path of the braking current is dependent on the motor generated voltage polarity. Specifically, when junction 120 is positive, the path is through diode 154 and contacts 56C and when the junction 120 is negative, the path is through diode 156.

By way of example of the operation of the above described device, assume that the operator has pushed the joystick forward. The sliding contact is moved off-center in the potentiometers 26 and 26'. The differential amplifier 104 produces an output voltage of several volts, e.g., 5 volts. The limiting circuit output rises exponentially to 5 volts. When the limiting circuit output reaches the limit of the deadband region, e.g., 1 volt, it causes the power relay 56 to be actuated. The power relay applies the battery pack voltage to power transistor 146. The absolute value circuit strips the polarity from the limiting circuit output and provides it with a negative polarity.

The speed reference signal, which is exponentially approaching −5 volts, is combined at the summing node 122 with the armature voltage from the node 120 and the deadband voltage from hysteresis amplifier 136. Because the joystick has just been actuated and the wheelchair is not yet moving, the latter voltages are, at first, essentially zero. As the potential or the difference signal at the summing node 122 increases, its amplitude adjusted by amplifier 124. The difference signal is combined at summing node 130 with the output of amplifier 128 which is zero when the wheelchair is stationary. The potential from summing node 130, the speed error reference signal, has its amplitude adjusted and its polarity inverted by amplifiers 134 and 140.

When the speed reference signal from the absolute valve circuit 108 is very close to zero, the voltage fed back by the hysteresis amplifier 136 balances out the speed reference signal. When the speed reference signal increases above the deadband region imposed by hysteresis amplifier 136, a non-zero speed error reference signal is produced. The speed error reference signal is compared by the pulse width modulator 144 with the signal from the oscillator 80. This comparison causes a pulse train of short duration pulses. The duration of the pulses grows with the growth of the speed reference signal. The pulse train gates the transistor 146 causing power to flow from the batteries to the motor armature which causes the wheelchair to start moving forward. Between pulses from the pulse width modulator 144, the pulse width modulator 148 gates transistor 150 connecting the input to the motor to ground.

Gating the transistor 146 causes a voltage at the node 120 and a current flow through the motor armature. The summing node 122 combines the deadband voltage from the hysteresis amplifier 136 with a feedback voltage from node 120 and a feedback voltage through resistor 132 which varies with the current flow through the armature. As the speed of the wheelchair approaches the selected speed, the potentials at the summing nodes 122 and 130 tend towards zero. This reduces the amplitude of the speed error reference signal which is compared with the oscillating signal from oscillator 80. As the speed error reference signal decreases, the width of the pulses in the pulse train produced by the pulse width modulator 144 similarly decreases. This reduces the amount of power supplied to the motor. If the width of the pulses in the pulse train from pulse width modulator 144 becomes too narrow, i.e., the amount of power supplied to the motor is too small to maintain the desired speed, the feedback signals from the armature voltage node 120 and the armature current amplifier 128 tend to drop causing the speed error reference signal to increase. In this manner, an equilibrium condition is reached when the motor reaches the selected speed.

If in use in a wheelchair which encounters an uphill grade, the motor starts to slow down decreasing the amplitude of the armature voltage and current feedback signals. This tends to increase the speed error signal which increases the amount of power delivered to the motor thus bringing the motor back to its selected speed. If the grade changes toward a downgrade, the chair tends to start rolling more quickly. This tends to increase the armature voltage and current feedback signals which reduces the amplitude of the speed error signal. This in turn reduces the amount of power supplied to the motor. If a sufficient downgrade is encountered, the speed error signal will change polarity causing the transistor 146 to reduce its duty cycle and transistor 150 to increase its duty cycle. This causes a reversal of the current flow in this motor. The current generated by the motor then flows alternately through transistor 150 to ground and through diode 154 to the battery to cause controlled regenerative braking.

The invention has been described with reference to the preferred embodiment. Obviously, modifications and alterations will become apparent to others upon reading and understanding the specification. It is our intention to include all such modifications and alterations which come within the scope of the appended claims or the equivalents thereof.

Having thus described a preferred embodiment, we now claim:

1. In an electric wheelchair having a first motor for driving a first wheel, a second motor for driving a second wheel, and a joystick for selecting a speed and track for the wheelchair, a feedback speed control circuit for tracking the wheelchair with the selected speed and with the selected track regardless whether the first and second wheels are under the same, different, and varying loads, the control circuit comprising:
   reference signal means for producing a first reference signal whose magnitude varies with the speed selected by the joystick for the first motor and a second reference signal which varies with the speed selected for the second motor, the reference signal means being operatively connected with the joystick;
   first detector for detecting the actual speed of the first motor and producing a first motor signal which varies therewith, the first detector being operatively connected with the first motor;

first speed comparing means for comparing the first reference signal and the first motor motor signal to produce a first variance signal which varies with the variance between the first motor selected and actual speeds;

a first variable power regulator for regulating the electric power supplied to the first motor, the power regulator being controlled by the first speed comparing means to vary the power supplied in accordance with the first variance signal;

second detector for detecting the actual speed of the second motor and producing a second motor signal which varies therewith, the second detector being operatively connected with the second motor;

second speed comparing means for comparing the second reference signal and the second motor signal to produce a second variance signal which varies with the variance between the second motor selected and actual speeds; and, a second variable power supply for supplying power to the second motor, the second power supply being controlled by the second comparing means to vary the power supplied in accordance with the second variance signal;

such that the actual wheelchair speed is maintained at the selected wheelchair speed regardless of changes of load on the motors and the actual track is maintained at the selected track regardless of variations between the loads on the first and second motors.

2. The speed control circuit as set forth in claim 1 wherein the first and second detectors are voltage detectors for detecting the voltage across the armature of the first and second motors, respectively, whereby the first and second motor signals vary with the first and second armature voltages, respectively, which in turn vary with the speeds of the first and second motors, respectively.

3. The speed control circuit as set forth in claim 2 wherein the reference signal means includes first and second potentiometers each having a resistive segment with first and second ends and a sliding contact which contacts the resistive segment between the first and second ends, the sliding contacts being operatively connected with the joystick for movement therewith, the potentiometers being operatively connected with a voltage source for producing the first and second reference signals, as an analog voltages which vary with the position of the joystick.

4. The speed control circuit as set forth in claim 3 wherein the reference signal means further includes a limiting circuit for limiting the rate of change of the first and second reference signals, whereby the limiting circuit limits the acceleration and deceleration of the wheelchair.

5. The speed control circuit as set forth in claim 3 wherein the first and second potentiometer sliding contacts are connected with the voltage supply and the first potentiometer first and second ends are connected with a first differential amplifier for subtractively combining analog voltages detected at the first potentiometer first and second ends and the second potentiometer first and second ends are connected with a second differential amplifier for subtractively combining the voltage detected at the second potentiometer first and second ends, whereby the outputs of the first and second differential amplifiers are the first and second reference signals, respectively, and vary with the selected speed and direction.

6. The speed control circuit as set forth in claim 2 wherein the reference signal means further includes first and second polarity detectors for detecting the polarity of the first and second reference signals, respectively, and first and second switching means for switching the polarity of the electric power applied to the first and second motors, respectively, whereby the direction of each motor is controlled by the polarity of the corresponding reference signal.

7. In an electric wheelchair having at least one motor for driving at least one wheel and a joystick for selecting a speed and direction for the wheelchair, a speed control circuit comprising:

reference signal means for producing a reference signal whose magnitude varies with the speed selected by the joystick and whose polarity varies with the direction selected by the joystick, the reference signal means being operatively connected with the joystick;

a polarity detector for detecting the polarity of the reference signal;

switching means for switching the polarity of the electric power applied to the motor, the switching means being controlled by the polarity detector, whereby the direction of the motor is controlled by the polarity of the reference signal;

an absolute value circuit for producing an output which varies with the magnitude of its input and is independent of its polarity, the absolute value circuit input being operatively connected with the reference signal means, whereby the reference signal from the absolute value circuit varies with the magnitude of the selected speed;

first detector for detecting the actual speed of the motor and producing a motor signal which varies therewith, the first detector being operatively connected with the motor;

speed comparing means operatively connected with the absolute value circuit and the first detector for comparing the reference signal and the motor signal to produce a variance signal which varies with the variance between the magnitude of the selected and actual speeds; and a variable power regulator for regulating the electric power supplied to the motor, the power regulator being controlled by the comparing means to vary the power supplied in accordance with the variance signal and being connected with the switching means for supplying power with the switched polarity.

8. In an electric wheelchair having at least one motor for driving at least one wheel and a joystick for selecting a speed and direction for the wheelchair, a speed control circuit comprising:

reference signal means for producing a reference signal whose magnitude varies with the speed selected by the joystick and whose polarity varies with the direction selected by the joystick, the reference signal means being operatively connected with the joystick;

a deadband circuit whose output has a preselected magnitude when its input is at a magnitude in a preselected range that includes zero magnitude and whose output varies with its input when the input is outside the preselected range, the deadband circuit being operatively connected with the reference signal means;

a polarity detector for detecting the polarity of the reference signal, the polarity detector being operatively connected with the deadband circuit such that when the polarity of differential amplifier output is in the preselected range its polarity is not detected by the polarity detector;

switching means for switching the polarity of the electric power applied to the motor, the switching means being controlled by the polarity detector, whereby the direction of the motor is controlled by the polarity of the reference signal;

first detector for detecting the actual speed of the motor and producing a motor signal which varies therewith, the first detector being operatively connected with the motor;

speed comparing means operatively connected with the reference signal means and the first detector for comparing the reference signal and the motor signal to produce a variance signal which varies with the variance between the selected and actual speeds; and a variable power regulator for regulating the electric power supplied to the motor, the power regulator being controlled by the comparing means to vary the power supplied in accordance with the variance signal and being connected with the switching means for supplying power with the switched polarity.

9. In an electric wheelchair having at least one motor for driving at least one wheel and a joystick for selecting a speed and direction for the wheelchair, a speed control circuit comprising:

reference signal means for producing a reference signal whose magnitude varies with the speed selected by the joystick, the reference signal means being operatively connected with the joystick;

a detector for detecting the actual speed of the motor and producing a motor signal which varies therewith, the detector being operatively connected with the motor;

speed comparing means for comparing the reference signal and the motor signal to produce a variance signal which varies with the variance between the selected and actual speeds;

an oscillator for producing an oscillating signal;

a first pulse width modulator for generating pulses of a variable width, the width varying with a comparison of the magnitude of a signal received at its first input and the magnitude of a signal received at its second input, the first input being operatively connected with the speed comparing means to receive the variance signal therefrom and the second input being operatively connected with the oscillator;

a first transistor means for supplying a voltage to the first motor armature, the first transistor means being gated by the first pulse width modulator such that each pulse gates the voltage to the armature for a duration corresponding to the duration of the pulse, whereby the greater the variance signal, the greater the amount of power that is supplied to the motor;

a second pulse width modulator for generating a pulse of a variable width, the width varying with a comparison of the magnitude of a signal received at its first input and the magnitude of a signal received at its second input, the first input being operatively connected with the oscillator and the second input being operatively connected with the speed comparing means, whereby the first and second pulse width modulators produce pulses alternately; and a second transistor means for connecting the armature of the motor to the ground, the second transistor means being gated by the second pulse width modulator such that the second pulse width modulator pulls the armature to the ground during each output pulse from the second pulse width modulator, whereby the first and second transistor means alternately supply power to the motor and connect it to ground.

10. The speed control circuit as set forth in claim 9 further including a battery for providing the voltage supplied to the motor by the first transistor means and a diode means which bypasses the first transistor means such that any voltage generated by the motor when the first transistor means is not gated conductive can flow through the diode means to the battery recharging it.

11. A speed control circuit for an electric wheelchair comprising:

reference signal means for producing a reference signal whose magnitude varies with a selected speed for an electric driving motor;

a voltage detector for detecting the voltage across an armature of the driving motor, the armature voltage varying proportionally with the actual speed of the motor;

first combining means for subtractively combining the reference signal and the armature voltage to produce a voltage difference signal which varies with the difference between the reference signal and the armature voltage;

a current detector for detecting the current flowing through the armature of the driving motor, the armature current varying proportionally with the actual speed of the motor, the current detector producing a current signal which varies with the magnitude of the armature current;

second combining means for subtractively combining the difference signal and the armature current signal to produce an armature current difference signal which varies in magnitude and polarity with the difference between the voltage difference signal and the armature current signal;

a feedback path between the current detector and the first combining means for feeding a portion of the armature current signal to the first combining means whereby the first combining means combines the reference signal, the armature voltage, and a portion of the armature current signal to produce the voltage difference signal; and, a variable power supply for supplying power to the armature, the power supply being controlled by the second combining means to supply an amount of power to the armature which varies with the current difference signal.

12. An electric wheelchair comprising at least one motor for driving at least one wheel, a joystick for selecting a speed and direction for the wheel to be driven, and a speed control circuit, the speed control including:

a variable potentiometer having a resistive element connected between first and second ends and a sliding contact which contacts the resistive element between the first and second ends, the sliding contact being operatively connected with the joystick for movement therewith;

a voltage supply operatively connected with the sliding contact;

a differential amplifier means for subtractively combining signals which it receives on first and second inputs, the first and second inputs being operatively connected with the first and second ends of the variable potentiometer, whereby the differential amplifier produces an output which varies in magnitude and polarity with the position of the sliding contact relative to the first and second ends of the potentiometer; and a variable power supply for supplying power to the drive motor, the power supply being operatively connected with the differential amplifier for providing an amount of power which varies with the differential amplifier output.

13. The electric wheelchair as set forth in claim 12 further including means for detecting the polarity of the differential amplifier output, the polarity detecting means being operatively connected with the differential amplifier output, means for reversing the direction of rotation of the drive motor, the reversing means being operatively connected with the polarity detecting means for selecting the direction of rotation of the motor in accordance with the detected polarity of the differential amplifier output, and an absolute value circuit for producing a signal which varies proportionally with the magnitude of the differential amplifier output, the absolute value circuit being operatively connected with the power supply such that the amount of power supplied to the motor varies only as a function of the magnitude of the differential amplifier output and not its polarity.

14. A speed control circuit for an electric wheelchair, the circuit comprising:
   a reference signal means for producing a reference signal whose magnitude varies with a selected speed;
   an oscillator for producing an oscillating signal;
   a first pulse width modulator for comparing the magnitude of a signal received at its first input and a signal received at its second input, the first input being operatively connected with the reference signal means and the second input being operatively connected with the oscillator, such that the first pulse width modulator generates a first pulse train whose periodicity varies with the oscillating signal and whose pulse width varies with the reference signal and oscillating signal comparison;
   a second pulse width modulator for comparing the magnitude of a signal received at its first and a signal received at its second input, its first input being operatively connected with the oscillator and its second input being operatively connected with the reference signal means such that the second pulse width modulator generates a second pulse train whose periodicity is determined by the oscillating signal and whose pulse width varies with the oscillating signal and reference signal comparison, the pulses of the first and second pulse trains being generated alternately;
   a first transistor means for supplying a voltage to an armature of an electric motor for driving the wheelchair, the first transistor means being gated by the first pulse width modulator such that each pulse gates the voltage to the armature for a duration corresponding to the pulse width;
   a second transistor means for connecting the armature of the motor to ground, the second transistor means being gated by the second pulse width modulator such that the second pulse width modulator pulls the armature to ground during each second pulse width modulator pulse, whereby the power supplied to the armature is limited to the voltage supplied through the first transistor means and ground and the speed is determined by the relative duration for which the first transistor means is gated relative to the duration for which the second transistor means is gated.

15. The speed control as set forth in claim 14 further comprising a deadband means connected between the oscillator and the first and second pulse width modulators for creating a deadband between the positive and negative going portions of the oscillating signal from the oscillator, whereby a small delay is created between the pulses of the first and second pulse trains to insure that the first and second transistor means are not gated simultaneously.

16. An electric wheelchair with consistant tracking regardless whether the wheelchair is on a level surface, uneven surface, sloping surface, or the like, the wheelchair comprising:
   a power supply for supplying electric power;
   a left drive wheel and a right drive wheel rotatably mounted on the wheelchair for driving it in forward and reverse directions;
   a left electric motor operatively connected with the left drive wheel for supplying driving force thereto and a right electric motor operatively connected with the right drive wheel for supplying driving force thereto;
   a speed selector for selecting a wheelchair speed and track by selecting a speed and direction for the left drive wheel and by selecting a speed and direction for the right drive wheel;
   a left speed control circuit for controlling the speed of the left motor, the left speed control including means for detecting the actual speed of the left motor, means for detecting the selected speed for the left motor, and a variable power regulator for regulating the amount of electric power supplied by the power supply to the left motor in a manner which tends to cause the selected and actual left motor speeds to match, the left speed control being operatively connected with the speed selector, the power supply, and the left motor; and,
   a right speed control circuit for controlling the speed of the right motor, the right speed control circuit including means for detecting the actual speed of the right motor, means for detecting the selected speed for the right motor, and a variable power regulator for regulating the amount of electric power supplied by the power supply to the right motor in a manner which tends to cause the selected and actual right motor speeds to match, the right speed control being operatively connected with the speed selector, the power supply and the right motor,
   such that in environments in which one wheel is under a different load than the other, such as crossing an uneven surface, the speed control circuits control the amount of power to each motor in such a manner that the left and right wheels each rotate at the selected speed and the wheelchair maintains the selected track.

17. A speed control circuit for electric motors comprising:

a reference signal means for producing a reference signal whose magnitude varies with a selected speed for the electric motor;

a voltage detector for detecting the voltage across an armature of the driving motor, the armature voltage varying proportionally with the actual speed of the motor;

first combining means for subtractively combining the reference signal and the armature voltage to produce a difference signal which varies with the difference between the reference signal and the armature voltage;

a current detector for detecting the current flowing through the armature of the driving motor, the armature current varying proportionally with the actual speed of the motor, the current detector producing a current signal which varies with the magnitude of the armature current;

second combining means for subtractively combining the difference signal and the armature current signal to produce an armature current difference signal which varies with the difference between the voltage difference signal and the armature current signal;

an oscillator for producing an oscillating signal;

a first pulse width modulator for comparing the magnitude of a signal received at its first input and a signal received at its second input, the first input being operatively connected with the reference signal means and the second input being operatively connected with the oscillator, such that the first pulse width modulator generates a first pulse train whose periodicity varies with the oscillating signal and whose pulse width varies with the reference signal and oscillating signal comparison;

a second pulse width modulator for comparing the magnitude of a signal received at its first and a signal received at its second input, its first input being operatively connected with the oscillator and its second input being operatively connected with the reference signal means such that the second pulse width modulator generates a second pulse train whose periodicity is determined by the oscillating signal and whose pulse width varies with the oscillating signal and oscillating signal comparison, the pulses of the first and second pulse trains being generated alternately;

a first transistor means for supplying a voltage to an armature of the electric motor for driving the wheelchair, the first transistor means being gated by the first pulse width modulator such that each pulse gates the voltage to the armature for a duration corresponding to the pulse width;

a second transistor means for connecting the armature of the motor to ground, the second transistor means being gated by the second pulse width modulator such that the second pulse width modulator pulls the armature to ground during each second pulse width modulator pulse, whereby the power supplied to the armature is limited to the voltage supplied through the first transistor means and ground and the speed is determined by the relative duration for which the first transistor means is gated relative to the duration for which the second transistor means is gated.

* * * * *